United States Patent [19]

Crissman

[11] 3,938,466

[45] Feb. 17, 1976

[54] LOCATION INDICATING DEVICE

[75] Inventor: Jay W. Crissman, Rosemead, Calif.

[73] Assignee: The Raymond Lee Organization, Inc., New York, N.Y. ; a part interest

[22] Filed: Oct. 7, 1974

[21] Appl. No.: 512,555

[52] U.S. Cl. ...... 116/124 R; 116/124 B; 116/DIG. 9
[51] Int. Cl.² .......................................... B64B 1/52
[58] Field of Search ...... 116/124 B, DIG. 8, DIG. 9, 116/124 R; 9/9; 46/90, 88, 87; 343/706

[56] References Cited
UNITED STATES PATENTS

| | | | |
|---|---|---|---|
| 2,506,884 | 5/1950 | Myers | 9/9 |
| 3,035,285 | 5/1962 | Squires | 116/124 B |
| 3,768,501 | 10/1973 | Elson | 46/90 |

Primary Examiner—S. Clement Wisher
Assistant Examiner—Denis E. Corr
Attorney, Agent, or Firm—Daniel Jay Tick

[57] ABSTRACT

A location indicating device comprises a container having two partitions therein forming three compartments. Each of the partitions has a hole therethrough. The container is open at one end at a first of the compartments and has a selectively openable cap covering the open end thereof and a hole formed through another end thereof at a second of the compartments. The third compartment is between the first and second compartments. Cord is provided in the second of the compartments extending at one end through the hole in the container. A grappling device is affixed to the end of the cord passing through the hole in the container. A valve is provided in the hole through the partition between the first and third compartments. A collapsed balloon in the first compartment has a neck part connected to the valve. The cord extends through the hole through the partition between the second and third compartments and is affixed to the valve in the third compartment. A valve in the container extends into the third compartment for filling the compartment with buoyant gas for filling the balloon via the valve when the cap of the container is opened.

1 Claim, 3 Drawing Figures

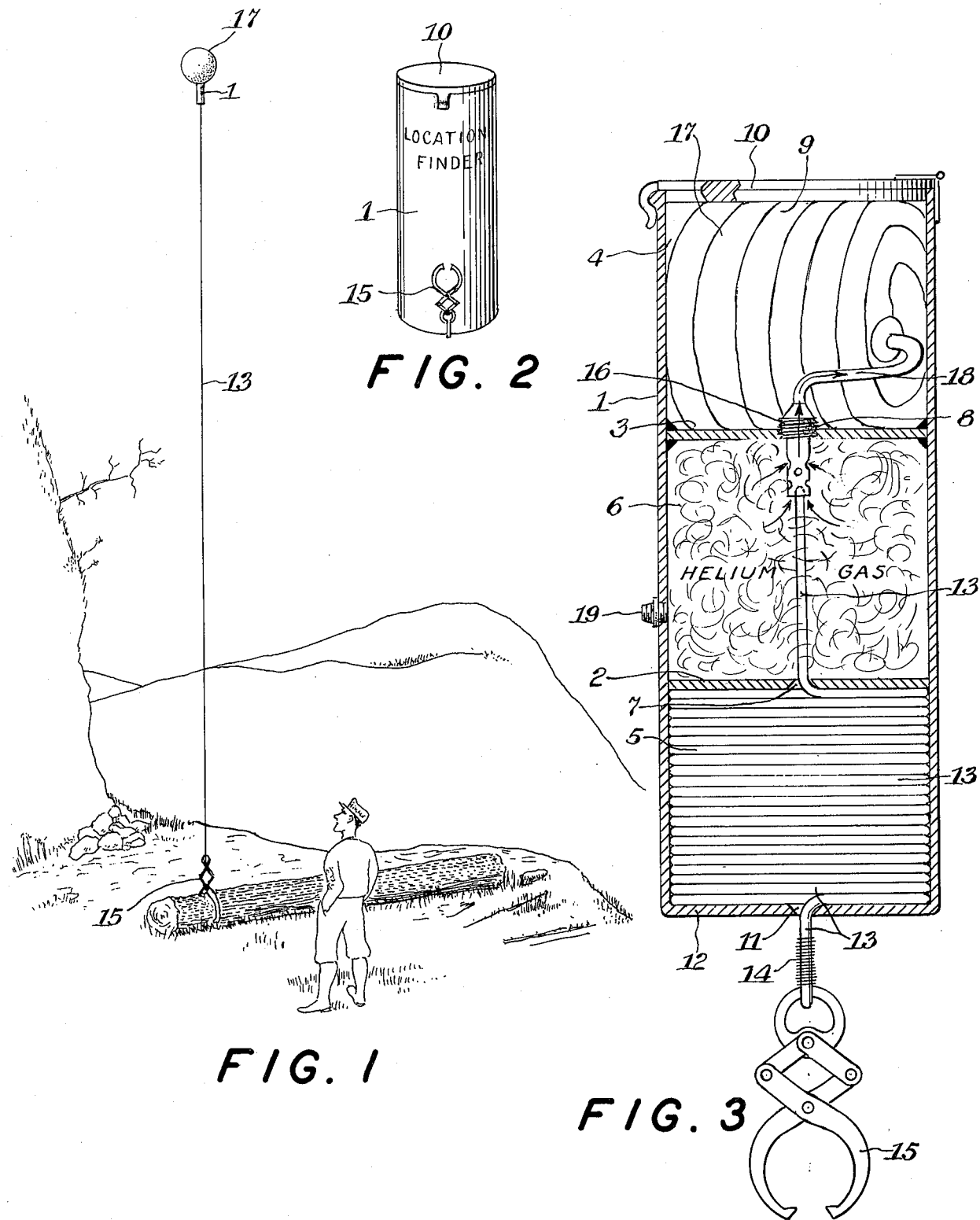

LOCATION INDICATING DEVICE

DESCRIPTION OF THE INVENTION

The present invention relates to a location indicating device.

Objects of the invention are to provide a location indicating device of simple structure, which is inexpensive in manufacture, is easily carried on the person of a user, is used with facility and convenience and functions efficiently, effectively and reliably to indicate the location of the user.

In order that the invention may be readily carried into effect, it will now be described with reference to the accompanying drawing, wherein:

FIG. 1 is a schematic diagram of an embodiment of the location indicating device of the invention in use;

FIG. 2 is a schematic diagram of the embodiment of FIG. 1 in stored condition; and FIG. 3 is a view, partly in section, and on an enlarged scale, of the embodiment of FIG. 1.

In the FIGS., the same components are identified by the same reference numerals.

The location indicating device of the invention comprises a container 1 having two partitions 2 and 3 therein forming three compartments 4, 5 and 6. Each of the partitions 2 and 3 has a hole 7 and 8, respectively, thereto. The container 1 is open at one end 9 at the first compartment 4 and has a selectively openable cap 10 covering the open end thereof, as shown in FIG. 3. A hole 11 is formed through the other end 12 of the container 1 at the second compartment 5, as shown in FIG. 3. The third compartment 6 is between the first and second compartment 4 and 5.

Cord 13 is stored in the second compartment 5 and extends at one end 14 through the hole 11 in the container (FIG. 3).

A grappling device 15 is affixed to the end 14 of the cord which passes through the hole 11 of the container 1.

A valve device, which is a one-way valve 16 (FIG. 3), is provided in the hole 8 through the partition 3 between the first and third compartments 4 and 6.

A collapsed ballon 17 is provided in the first compartment 4 and has a neck part 18 connected to the one-way valve 16. The cord 13 extends through the hole 7 in the second partition 2 and is affixed to the valve 16 in the third compartment 6.

A valve 19 in the container 1 extends into the third compartment 6 for filling said compartment with buoyant gas such as, for example, helium, for filling the ballon 17 via the one-way valve 16 when the cap 10 of the container 1 is opened.

While the invention has been described by means of a specific example and in a specific embodiment, I do not wish to be limited thereto, for obvious modifications will occur to those skilled in the art without departing from the spirit and scope of the invention.

I claim:

1. A location indicating device, comprising a container having two partitions therein forming three compartments, each of the partitions having a hole therethrough, the container being open at one end at a first of the compartments and having a selectively openable cap covering the open end thereof and a hole formed through another end thereof at a second of the compartments, the third compartment being between the first and second compartments;

cord in the second of the compartments extending at one end through the hole in the container;

grappling means affixed to the end of the cord passing through the hole in the container for clamping to an object;

valve means in the hole through the partition between the first and third compartments;

a collapsed balloon in the first compartment, the balloon having a neck part connected to the valve means, the cord extending through the hole through the partition between the second and third compartments and being affixed to the valve in the third compartment; and a valve in the container extending into the third compartment for filling said compartment with buoyant gas for filling the balloon via the valve means when the cap of the container is opened.

* * * * *